UNITED STATES PATENT OFFICE.

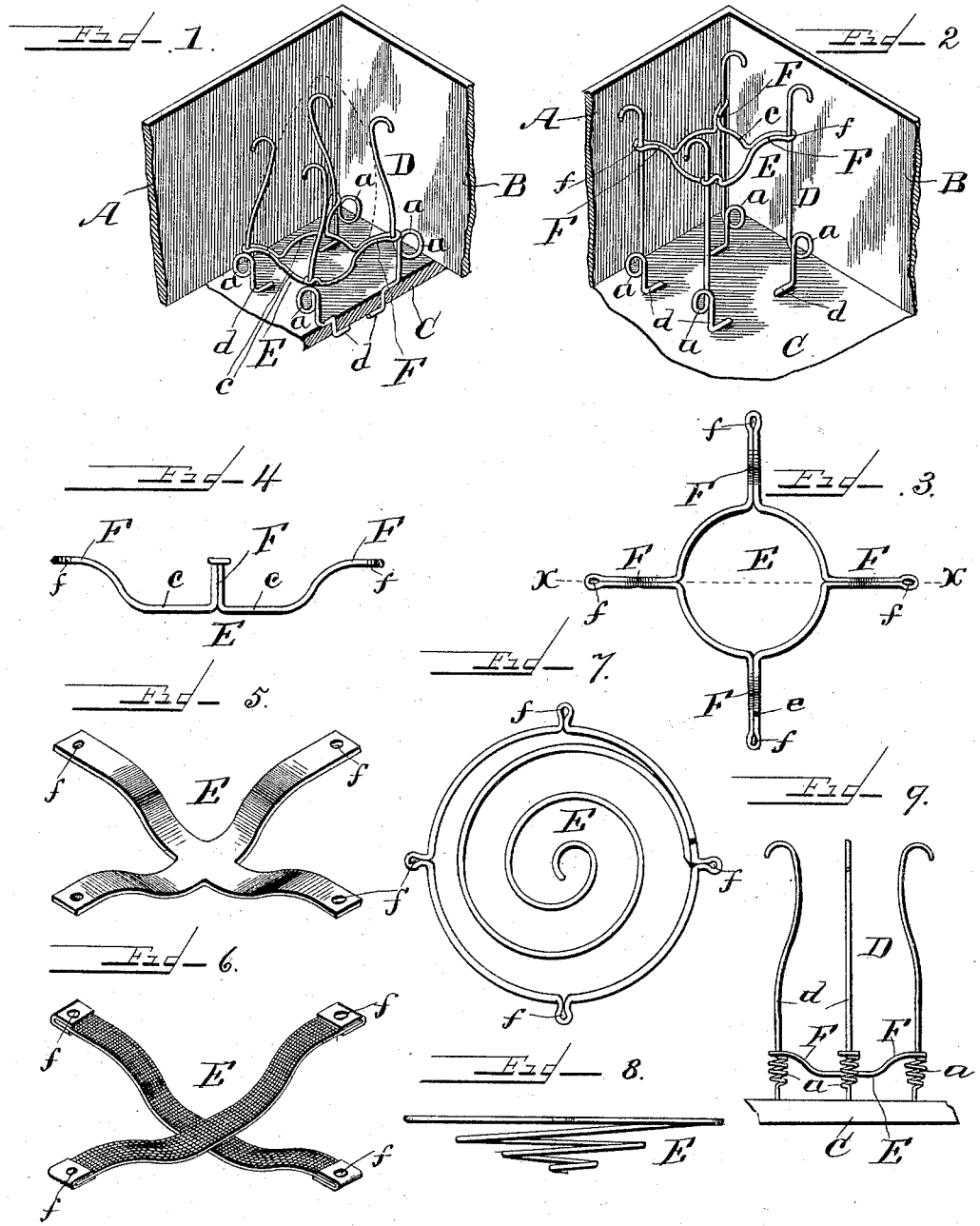

CORNELIUS T. BELT, OF WASHINGTON, DISTRICT OF COLUMBIA.

EGG-CRATE.

SPECIFICATION forming part of Letters Patent No. 495,773, dated April 18, 1893.

Application filed May 17, 1892. Serial No. 433,396. (No model.)

*To all whom it may concern:*

Be it known that I, CORNELIUS T. BELT, a citizen of the United States, residing at Washington, in the District of Columbia, have invented certain new and useful Improvements in Egg-Crates, of which the following is a specification.

This invention relates to egg crates, and particularly to a holder and support for eggs when packed in crates.

The object of the invention is to provide means for supporting eggs for transporting them in crates.

A further object of the invention is to provide a holder and support to suspend eggs in crates for transportation.

A still further object of the invention is to provide an egg holder with a vertically movable seat or support, whereby the holder is opened for the purpose of delivering the egg.

The invention consists in the novel construction of an egg seat or support, and the mode of suspending the egg by means of the seat movably supported, by a series of coiled standards.

In the accompanying drawings forming part of this application, Figure 1 is a perspective view of my egg holder and support, showing an egg in dotted lines seated in the support, and the crate broken away. Fig. 2 is a similar view showing the support raised and the egg delivered. Fig. 3 is an enlarged top view of the support. Fig. 4 is a sectional view of the support taken on the dotted line $x-x$ in Fig. 3. Fig. 5 is a modification of my support stamped out of sheet metal. Fig. 6 is a modification of the support formed from elastic material, with metal tips. Fig. 7 is a modification of the support made of one piece of wire coiled and bent to form loops. Fig. 8 is a side elevation of Fig. 7, and Fig. 9 is a modification of the holder, showing the wire bent in the form of a spiral spring.

The same letters of reference denote the same parts throughout the several figures.

A, and B, denote, respectively, part of a side and end of a crate, or egg packing tray.

To the bottom C of the crate is secured the holder D, composed of a series of wires $d$, each bent at right angles three times, whereby they are made to firmly grasp the said bottom C. Each of these wire standards $d$ has a coil $a$ formed therein at a short distance from the bottom C of the tray, to allow the coils free play. From the coils $a$ the standards $d$ are curved inward toward each other, leaving a space between their top ends somewhat smaller than an egg, so that when an egg is introduced between them they will spring apart by means of the coils $a$. The egg seat or support E is formed of one continuous piece of wire, bent to form a circular bearing $c$ for the egg, with arms F projecting upward and outward from said bearing $c$, and in said arms is formed an aperture or loop $f$. After the circular bearing, the arms, and the loops have been thus formed, the wire is soldered at $e$. By this construction a support of any size may be produced to suit the standards placed at any distance apart. The support E is attached to the standards $d$ by placing the support over the top ends of the standards, then inserting a standard through each loop $f$, which allows the support to slide vertically down and its arms F to rest upon the coils $a$, so that when an egg is seated in the support its weight will vibrate the said coils, and the jolting occasioned by handling in transportation is entirely avoided. The egg is held firmly in its seat by the pressure of the top ends of the standards $d$, and should the egg move from its seat by upsetting the crate, the support will follow it. This construction and arrangement for suspending an egg in a vertically movable seat or support which is suspended by the coils of the standards removes the egg from any direct action of the said coils. That is the egg seat or support is entirely free from the crate and loosely mounted upon the standards, so that any rough handling or jolting of said crate will not disturb the egg, as the coils and arms of the support break and carry off the same, leaving the egg in its seat until removed by hand. The support is also employed to discharge the egg from its seat and from the holder D, by moving the said support upward on the standards $d$, which causes them to gradually spread apart at their top, leaving the egg free to be lifted out, as particularly shown in Fig. 2.

The egg support may be constructed of different material such as sheel metal, fabric, or elastic material, and in different forms, as shown in the modifications thereof. The holder or standards may have different forms of coils so as to render them of varied tension, and they may be also made of different material. I therefore do not wish to be understood as limiting myself to any particular material in the construction of my supports nor to any particular form of coiled standards, but

What I claim as new, and desire to secure by Letters Patent, is—

1. A device for supporting eggs for transportation, consisting of an egg seat having holes or loops, and a series of coiled standards, which pass through the holes or loops, whereby the seat is supported upon the coils of the said standards, as set forth.

2. A device for suspending eggs out of contact with the egg tray consisting of the coiled standards, and the support E loosely secured to the said standards and adapted to be moved vertically thereon, substantially as set forth.

3. An egg support consisting of a single piece of wire, bent to form a central circular seat, a series of arms which radiate from said seat, a hole or loop in each arm, and a standard secured to the egg tray to engage each of said arms substantially as shown and described.

4. In combination with an egg crate, the holder secured to the crate, and the support secured to the holder and adapted to move vertically thereon, substantially as shown and described.

5. The combination with an egg crate, and the wire holder, of a device for suspending an egg in the holder, which consists of a single piece of wire bent to form a circular egg seat, and a series of arms radiating from said seat having apertures to engage the said wire holder, substantially as and for the purpose set forth.

In witness whereof I hereunto set my hand in the presence of two witnesses.

CORNELIUS T. BELT.

Witnesses:
M. DORIAN,
J. MAWDSLEY.